United States Patent
Underbrink et al.

(10) Patent No.: US 7,792,650 B2
(45) Date of Patent: Sep. 7, 2010

(54) EDGE-ALIGNED RATIO COUNTER

(75) Inventors: Paul Underbrink, Lake Forest, CA (US); Steven A. Gronemeyer, Cedar Rapids, IA (US)

(73) Assignee: SiRF Technology Inc., San Jose, CA (US)

( * ) Notice: Subject to any disclaimer, the term of this patent is extended or adjusted under 35 U.S.C. 154(b) by 618 days.

(21) Appl. No.: 11/014,684

(22) Filed: Dec. 16, 2004

(65) Prior Publication Data

US 2006/0047459 A1 Mar. 2, 2006

Related U.S. Application Data

(63) Continuation of application No. PCT/US2004/028542, filed on Sep. 2, 2004, said application No. 11/014,684 is a continuation of application No. PCT/US2004/028926, filed on Sep. 2, 2004.

(60) Provisional application No. 60/499,961, filed on Sep. 2, 2003, provisional application No. 60/546,816, filed on Feb. 23, 2004, provisional application No. 60/547,384, filed on Feb. 23, 2004.

(51) Int. Cl.
*G06F 1/06* (2006.01)
*H03L 7/00* (2006.01)

(52) U.S. Cl. .................. 702/79; 702/75; 702/78; 327/39; 327/144

(58) Field of Classification Search ............ 702/75–79, 702/71, 64, 66, 70, 73, 74, 125, 124, 178, 702/189, 78; 701/213, 214
See application file for complete search history.

(56) References Cited

U.S. PATENT DOCUMENTS

| | | | | |
|---|---|---|---|---|
| 6,662,107 | B2 * | 12/2003 | Gronemeyer | 701/213 |
| 6,778,136 | B2 * | 8/2004 | Gronemeyer | 342/357.15 |
| 6,788,655 | B1 * | 9/2004 | Underbrink | 370/324 |
| 6,985,811 | B2 * | 1/2006 | Gronemeyer | 701/213 |
| 2004/0223570 | A1 * | 11/2004 | Adkisson | 375/359 |

* cited by examiner

*Primary Examiner*—Hal D Wachsman
(74) *Attorney, Agent, or Firm*—RatnerPrestia

(57) ABSTRACT

An Edge-Aligned Ratio Counter (EARC) that includes at least one processor coupled to at least one counter circuit is provided for determining a ratio between two clock signals by receiving a first and a second value in response to a first clock signal and generating a control signal under control of the loaded value by counting the pulses of the first clock signal and a second clock signal and captures the count of each clock signal in response to the control signal and determining a ratio between a frequency of the first clock signal and a frequency of the second clock signal using the differences of the captured counts taken at two different occurrences of the control signal.

31 Claims, 11 Drawing Sheets

800

| Number of Terms | Numerator | Denominator | 1/Ratio | Error |
|---|---|---|---|---|
| 1 | 1 | 2 | 2 | -0.91097560976 |
| 2 | 1 | 3 | 3 | +0.08902439024 |
| 3 | 11 | 32 | 2.90909090909 | -0.00188470067 |
| 4 | 45 | 131 | 2.91111111111 | +0.00013550136 |
| 5 | 146 | 425 | 2.91095890411 | -0.00001670565 |
| 6 | 337 | 981 | 2.91097922849 | +0.00000361873 |
| 7 | 820 | 2387 | 2.910975609756... | 0 |

| No. Terms | Num | Den | Slip (µs) | Period (µs) | Accuracy (ppm) |
|---|---|---|---|---|---|
| 1 | 1 | 2 | -0.015902 | 0.034911 | NA |
| 2 | 1 | 3 | +0.001554 | 0.052367 | -2543.554007 |
| 3 | 11 | 32 | -0.000362 | 0.558581 | + 127.188388 |
| 4 | 45 | 131 | +0.000106 | 2.286692 | - 10.966836 |
| 5 | 146 | 425 | -0.000043 | 7.418657 | + 1.734726 |
| 6 | 337 | 981 | +0.000021 | 17.124005 | - 0.362088 |
| 7 | 820 | 2387 | 0 | 41.666667 | 0 |

| No. Terms | Num | Den | Slip (μs) | Period (μs) | Accuracy (ppm) |
|---|---|---|---|---|---|
| 1 | 1 | 499 | -0.033125 | 30.48 | NA |
| 2 | 1 | 500 | +0.027965 | 30.55 | -305.379367 |
| 3 | 2 | 999 | -0.005160 | 61.03 | + 13.007800 |
| 4 | 11 | 5495 | +0.002162 | 335.70 | -  2.024731 |
| 5 | 24 | 11989 | -0.000835 | 732.42 | +  0.329745 |
| 6 | 59 | 29473 | +0.000492 | 1800.54 | -  0.113578 |
| 7 | 83 | 41462 | 0.000343 | 2532.96 | +  0.049959 |

FIGURE 10

EDGE-ALIGNED RATIO COUNTER

1. RELATED APPLICATIONS

This application is a continuation of and claims priority under 35 U.S.C. §120 to Patent Cooperation Treaty ("PCT") Patent Applications PCT/US2004/028542 filed on Sep. 2, 2004 and Ser. No. PCT/US2004/028926 filed on Sep. 2, 2004, both of which are also incorporated by reference herein in their entireties;

PCT Patent Application PCT/US2004/028542 filed on Sep. 2, 2004, claims priority under 35 U.S.C. §119(e) to:

(a) U.S. Provisional Patent Application No. 60/499,961, filed Sep. 2, 2003, entitled "A GPS SYSTEM," by Paul Underbrink, Henry Falk, Mangesh Chansarkar, Sundar Raman, Charles Norman, Steven Gronemeyer, Robert Tso, Nicolas Vantalon, Chittharanjan Dasannacharya, and Voya Protic; and (b) U.S. Provisional Patent Application No. 60/546,816, filed Feb. 23, 2004, entitled "CONTROL AND FEATURES FOR SATELLITE POSITIONING SYSTEM RECEIVERS," by Mangesh Chansarkar, Sundar Raman, James Brown, Robert Harvey, Peter Michali, Bill Higgins, Paul Underbrink, Henry Falk and Charles Norman;

PCT Patent Application Serial No. PCT/US2004/028926 filed Sep. 2, 2004claims priority under 35 U.S.C. §119(e) to:

(a) U.S. Provisional Patent Application No. 60/499,961, filed Sep. 2, 2003, entitled "A GPS SYSTEM," by Paul Underbrink, Henry Falk, Mangesh Chansarkar, Sundar Raman, Charles Norman, Steven Gronemeyer, Robert Tso, Nicolas Vantalon, Chittharanjan Dasannachrya, and Voya Protic;

(b) U.S. Provisional Patent Application No. 60/546,816, filed Feb. 23, 2004, entitled "CONTROL AND FEATURES FOR SATELLITE POSITIONING SYSTEM RECEIVERS," by Mangesh Chansarkar, Sundar Raman, James Brown, Robert Harvey, Peter Michali, Bill Higgins, Paul Underbrink, Henry Falk, and Charles Norman; and (c) U.S. Provisional Patent Application No. 60/547,384, filed Feb. 23, 2004, entitled "SIGNAL PROCESSING SYSTEM FOR SATELLITE POSITIONING SIGNALS," by Paul Underbrink, Henry Falk, Steven A. Gronemeyer, Chittharanjan Dasannacharya, Charles Norman, Robert Tso, Nicholas Vantalon, and Voya Protic.

2. TECHNICAL FIELD

The disclosed embodiments relate generally to portable communication devices and, more particularly, to determining ratios between frequencies of two or more clocks in the portable communication devices.

3. BACKGROUND

In communication devices it is common to have multiple clocks or oscillators that provide clock signals of varying characteristics, including frequency, to device circuitry. In order for the device to operate properly, it is often necessary for certain device operations that operate at different clock frequencies to be synchronized. In order to accomplish this it is necessary to determine the frequency at which a clock operates in relation to a known, or predetermined, reference clock. This is typically done by counting, for a predetermined and known period of time, the number of cycles of a known reference clock having a known frequency, as well as the number of cycles of a second clock of unknown frequency.

A typical circuit for determining a ratio between two clock signals is shown in FIG. 11. This prior art circuit included a numerator latch 1 for receiving and storing the contents of an incrementing counter 7 when a load count signal LCS is received by the numerator latch 1. Incrementing counter 7 was clocked by a clock signal CLK 1. With each pulse of the clock signal CLK 1 the count value of the incrementing counter 7 increased by a value of one (1). There was also provided a denominator latch 4 which, upon receiving load count signal LCS, received and stored the contents of an incrementing counter 5. Incrementing counter 5 was clocked by a clock signal CLK 2. The count value controlling the incrementing counter 5 is increased by a value of one (1) with each pulse of the clock signal CLK 2. Upon receipt of the load count signal LCS, numerator latch 1 and denominator latch 4 made their respective values available for output as numerator out signal 8 and denominator out signal 9, respectively. In order to compute the ratio of the two clock signals CLK 1 and CLK 2, the values of the numerator out signal 8 and denominator out signal 9 were divided to produce the ratio between clock signals CLK 1 and CLK 2.

Where, for example, the frequency of CLK 1 was known, the ratio between the value of numerator latch 1 and denominator latch 4 can be used to compute the frequency of the clock signal CLK 2. This process was typically carried out as a part of a dedicated clock pulse count operation and was only as accurate as the resolution of the counting device allowed. The uncertainty in the resulting clock ratio measurement was proportional to the period of the slower clock and inversely proportional to the length of time over which the counts were accumulated. This typical ratio-counting device did not provide for dynamically increasing the accuracy of the count while counting the clock cycles. Thus, there is a need to address the deficiencies and inadequacies in the typical ratio-counting devices.

BRIEF DESCRIPTION OF THE FIGURES

FIG. 8 is a table that includes a sequence of rational fractions that express a ratio of two nominal clock frequencies, under an embodiment.

FIG. 9 is a table that includes example EARC parameters and performance, under an embodiment.

FIG. 10 is a table that includes example EARC parameters and performance for an RTC crystal clock and frequency $16F_0$, under an embodiment.

DETAILED DESCRIPTION

A circuit is provided herein for determining a ratio between two clock signals. The circuit, also referred to herein as the counter circuit or Edge-Aligned Ratio Counter (EARC), includes at least one processor coupled to at least one counter circuit. The counter circuit receives one of a first and second value in response to a first clock signal and generates a control signal under control of the loaded value. The counter circuit counts pulses of the first clock signal and a second clock signal and captures the count of each clock signal in response to the control signal and determines a ratio between a frequency of the first clock signal and a frequency of the second clock signal using the differences of the captured counts taken at two different occurrences of the control signal.

In the following description, numerous specific details are introduced to provide a thorough understanding of, and enabling description for, embodiments of the EARC. One skilled in the relevant art, however, will recognize that the EARC can be practiced without one or more of the specific details, or with other components, systems, etc. In other instances, well-known structures or operations are not shown, or are not described in detail, to avoid obscuring aspects of the EARC.

Definitions follow for some terms used herein. These definitions are provided as representative examples and are not considered to limit the embodiments realized hereunder. A "Sampling Edge" is an edge of the "reference clock", which may be rising or falling, specified as the "sampling point". A "Sampling Point" is an edge of the "reference clock" used to sample the value of the "sampled clock". A "Sampled Value" is the logic value, zero or one, of the "sampled clock" taken at the "sampling point". A "Target Edge" is the edge of the "sampled clock", which may be rising or falling, that the "sampling point" attempts to align with. "Advance" is a "sampling point" that occurs later in the cycle of the "sampled clock" than the prior "sampling point".

Continuing with definitions, "Slew" is the change in offset between "reference clock sampling edge" and "sampled clock target edge". Slip is an alternate term for "slew". "Coarse Slew" is the "slew" that is the larger of the two "slew" values caused by $R_0$ and $R_1$. "Fine Slew" is the "slew" that is the smaller of the two "slew" values caused by $R_0$ and $R_1$. "Retard" is a slew after which the "sampling point" occurs earlier in a cycle of the "sampled clock" than the prior "sampling point".

Further, a "Load Pulse" transfers the "reference clock" counter and "sampled clock" counter values to their respective registers when the "target edge" is detected during a "fine slew". "Magic Gate" is an alternate name for "load pulse".

Figure 1:
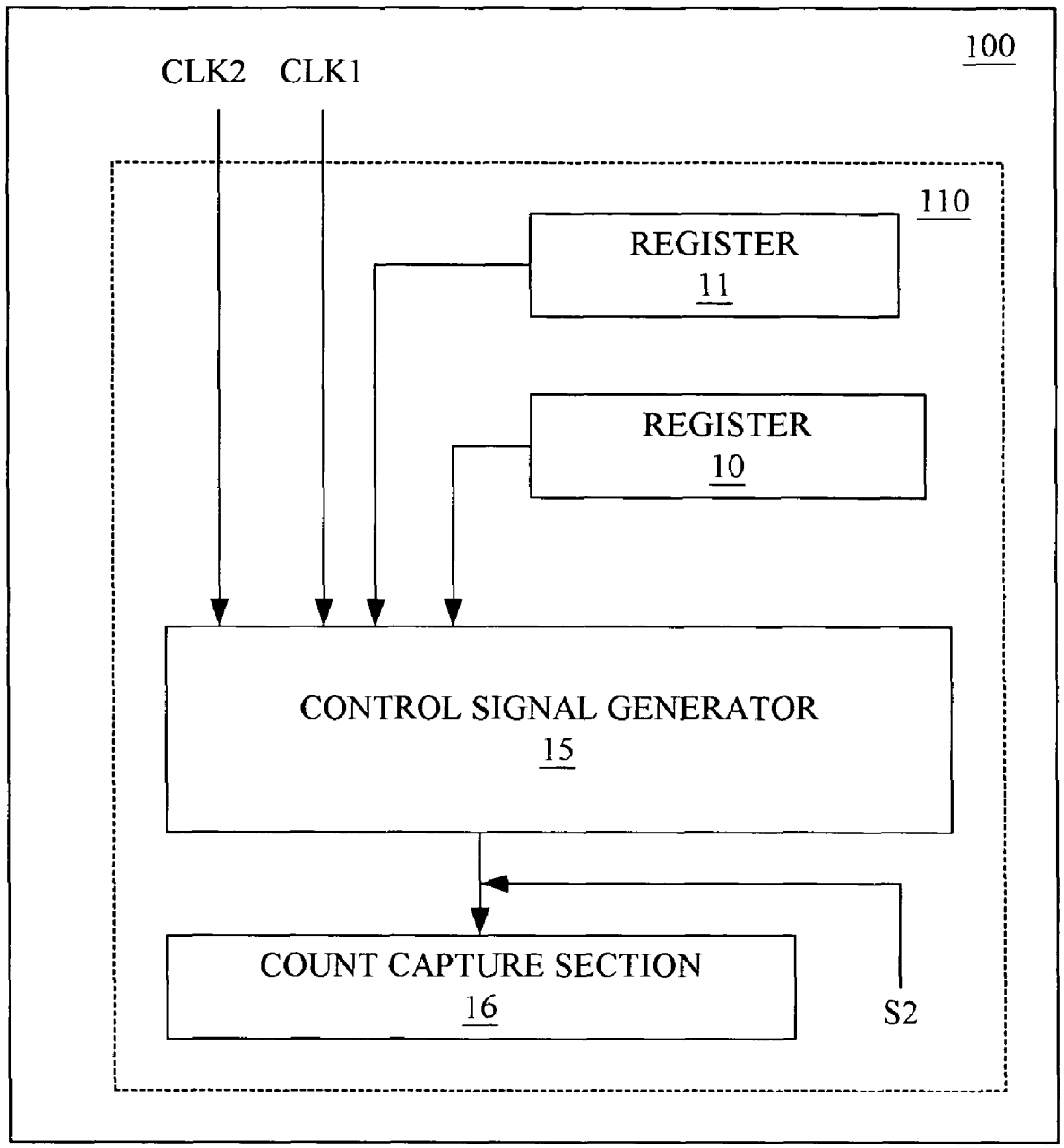
FIG. 1 is a block diagram of a portable communications device including a ratio counter, under an embodiment.

FIG. 1 is a block diagram of a portable communications device 100 including a ratio counter 110, under an embodiment. The ratio counter, also referred to herein as an Edge-Aligned Ratio Counter (EARC) 110 or clock ratio counter 110, includes a register 10 and a register 11. A control signal generator 15 alternatively selects and receives an input value from register 10 and register 111 as well as an input of a clock signal CLK 1 from a clock under examination. This may be, for example, a clock signal from the clock signal source (clock) of a telecommunications receiver. A second clock signal CLK 2 is received from a second clock source under evaluation. CLK 2 may be, for example, a clock signal from a clock source of a Global Positioning System (GPS) receiver. The values stored in register 10 and 11 are pre-selected. The selection of these values is described below. Control signal generator 15 responds to these inputs by producing a control signal S2 and providing the control signal S2 to count capture section 16.

Figure 2:
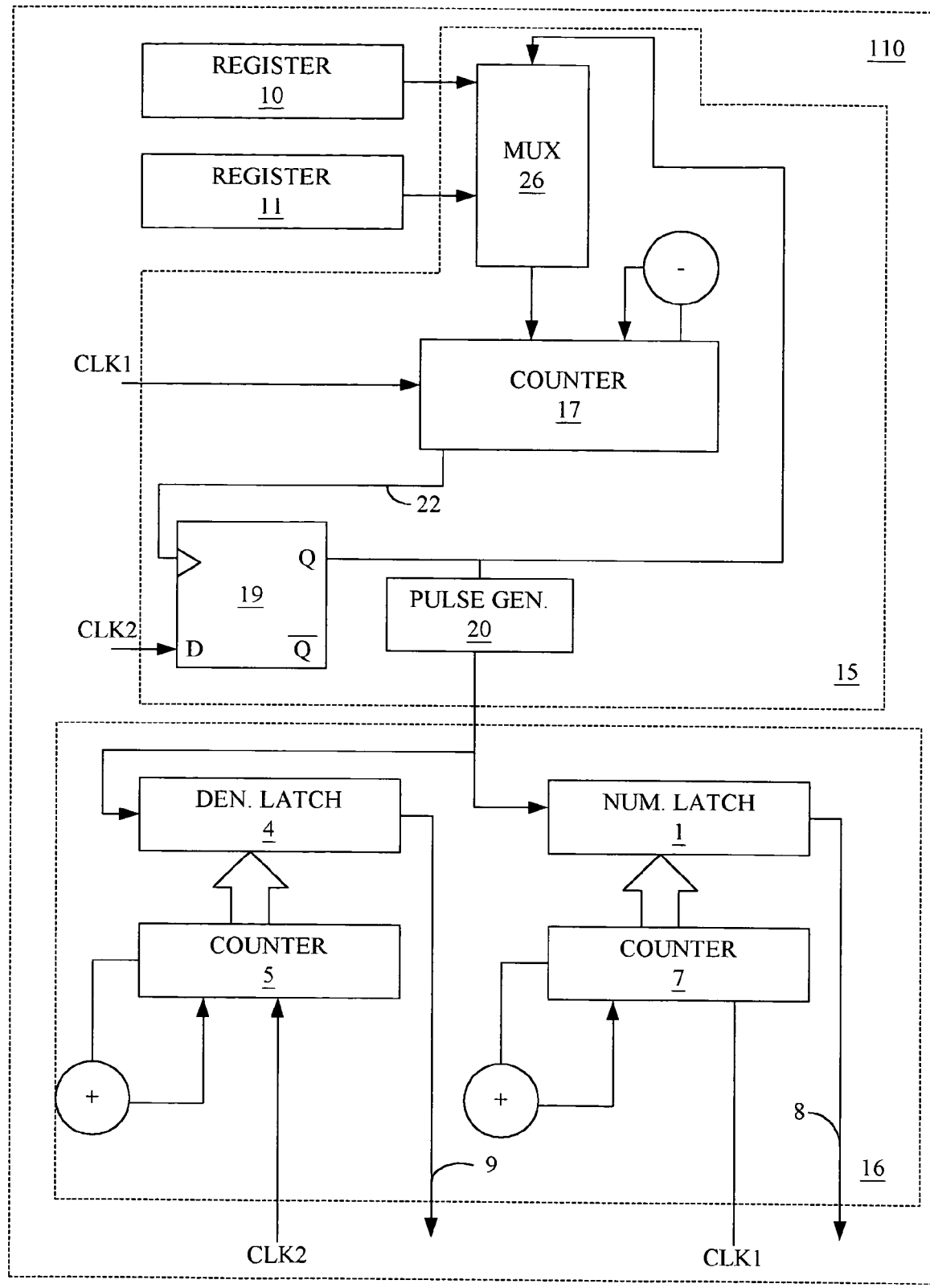
FIG. 2 is a block diagram of a clock ratio counter, under an embodiment.

Turning to FIG. 2, a block diagram of the clock ratio counter 110, under an embodiment. The control signal generator 15 of an embodiment includes multiplexer 26, a decrementing counter 17, a flip-flop 19 and a pulse generator 20.

The multiplexer 26 selects between the input from either register 10 or register 11 in accordance with an edge transition signal S1 from flip-flop 19. Depending upon which register 10 or 11 that is selected by multiplexer 26, the contents of the selected register are input to decrementing counter 17. The value loaded into decrementing counter 17 is then decremented by one (1) for each pulse of the clock signal CLK 1 (the reference clock). Once the contents of decrementing counter 17 have reached a zero (0) value, decrementing counter 17 issues an enable signal 22 to the clock input of flip-flop 19. The sampled clock (CLK2) couples to the D (data) input of the flip-flop. Flip-flop 19 then outputs an edge transition signal S1, in accordance with the inputs of clock signals CLK 1 and CLK 2. The edge transition signal S1 from flip-flop 19 is also fed to pulse generator 20. In response to edge transition output S1, pulse generator 20 generates a control signal S2 if S1 indicates that the target edge has been detected. The target edge has been detected when the value of S1 relative to the prior value of S1 matches the target edge, either rising (0 to 1 transition) or falling (1 to 0 transition). Control signal S2, if generated, is then used to enable numerator latch 1 and denominator latch 4 so as to receive the contents of incrementing counters 7 and 5, respectively. The contents of numerator latch 1 and denominator latch 4 can be read out and used to estimate the ratio between the frequency of clock signal CLK 1 and the frequency of clock signal CLK 2 by differencing these values, respectively, with their corresponding counts from a previous pair of counter readings.

Figure 3:
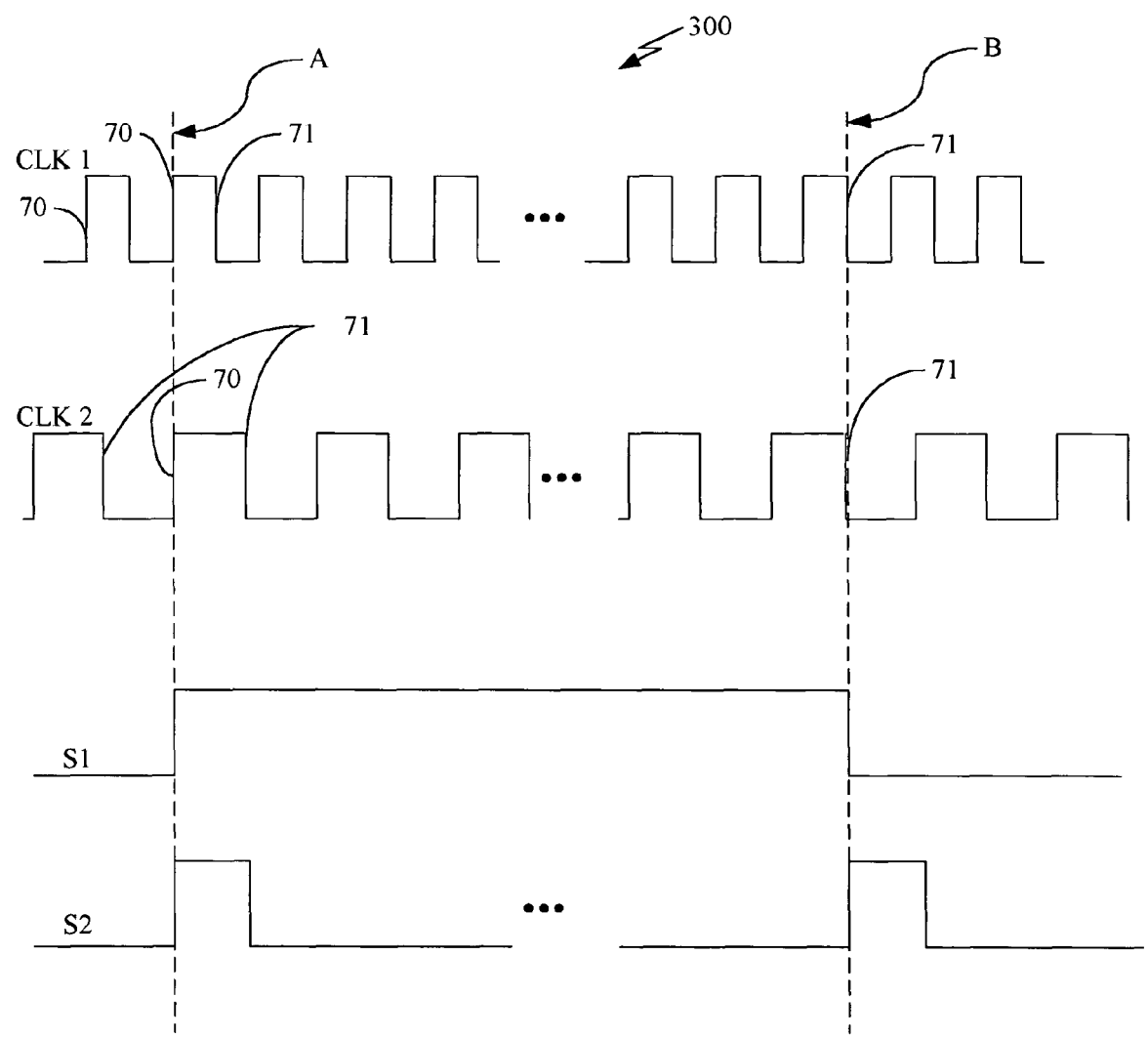
FIG. 3 is a timing diagram, under an embodiment.

In FIG. 3, timing diagram 300 shows a relation between clock signal CLK 1, clock signal CLK 2 and edge transition signal S1. Both CLK 1 and CLK 2 have a leading edge 70, and a trailing edge 71. For purposes of discussion, it will be understood that leading edge 70 and trailing edge 71 are transitioning edges, but are not so limited. The timing diagram 300 shows that the instances at which clock signal CLK 1 and clock signal CLK 2 have transitioning edges which coincide and are in near-synchronization with each other is a reoccurring, although not constant, scenario. As described below, the two clocks are not synchronous in any manner, so the edge alignments shown are approximate, not precise. In one embodiment, CLK1 samples CLK2 just after CLK2 has made the desired transition. The timing diagram 300 further shows that at the point A, a leading edge 70 of clock signal CLK 1 transitions from low to high (assuming that the rising edge has been specified as the sampling edge) at the same time that a leading edge 70 of clock signal CLK 2 has already transitioned from low to high (assuming that the rising edge has been specified as the target edge). In response, edge transition signal S1 from flip-flop 19 changes from low to high and a control signal S2 is generated, since the target edge was specified as a rising edge and has been detected. Similarly, at point B, a trailing edge 71 of clock signal CLK 1 transitions from high to low (assuming that the falling edge of the reference clock was specified as the sampling edge) at the same time that a trailing edge 71 of clock signal CLK 2 has transitioned from high to low (assuming that the falling edge of the sampled clock was specified as the target edge). In response, edge transition signal S1 from flip-flop 19 changes from high to low and control signal S2 is generated because the target edge, specified as falling, has been detected. In any one application of the device, only one sense of sampling edge (rising or falling) and only one sense of target edge (rising or falling) is used. Hence, a rising sampling edge can be used either to search for a target edge that is rising or to search for a target edge that is falling. Similarly, a falling sampling edge can be used to search for either a target edge that is falling or for a target edge that is rising. Only one of these four possible combinations is used at a time. Which combination is to be selected is determined by the expected ratio of the clock frequencies, the desired accuracy of the measurement and the desired duration of the measurement time. These parameters are not independent and are constrained by the clock frequencies involved, as explained subsequently.

Figure 4:
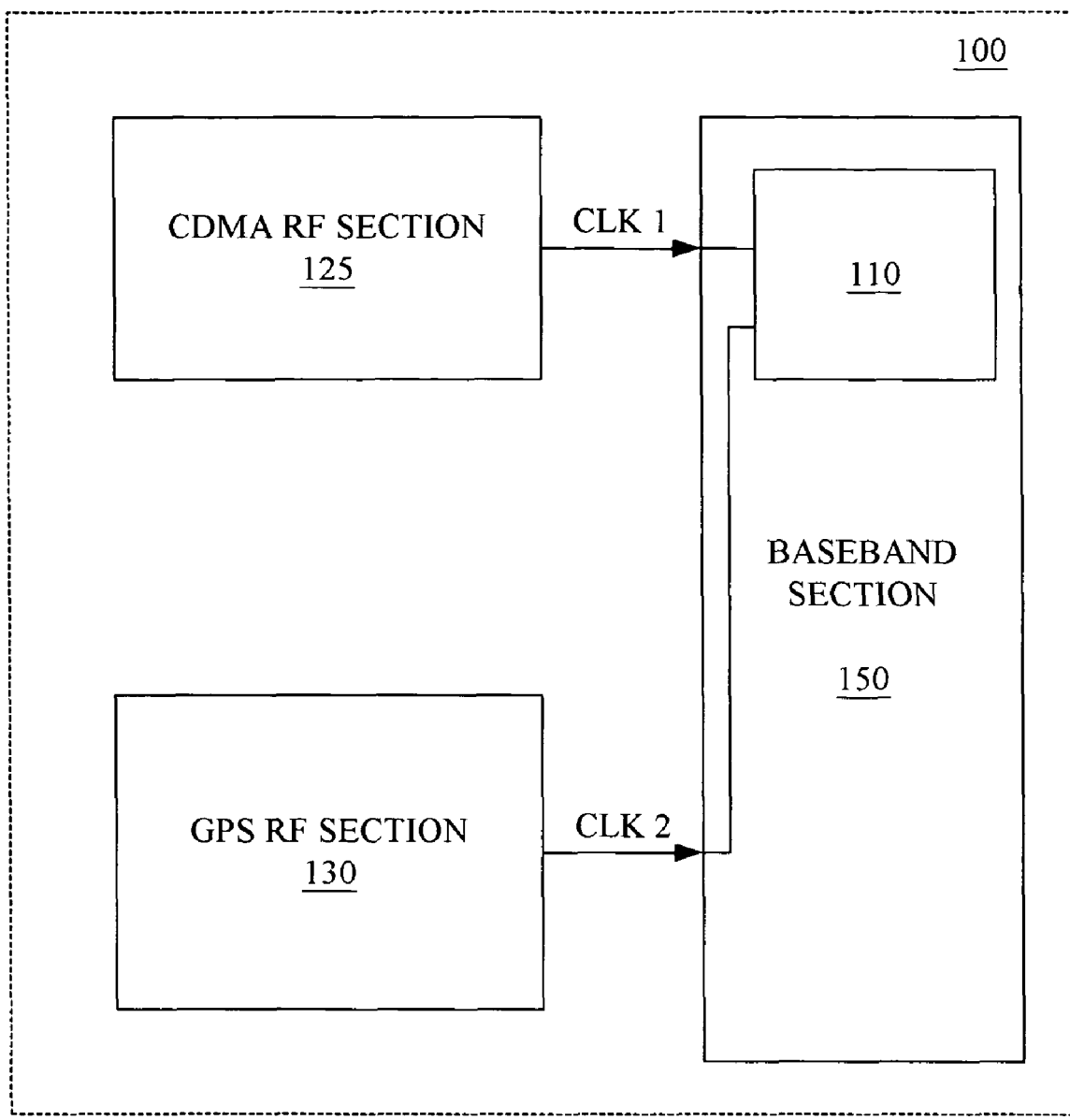
FIG. 4 is a block diagram of a portable communications device, under an alternative embodiment.

FIG. 4 is a block diagram of a portable communications device 100, under an alternative embodiment. The ratio counter 110 of this embodiment is included as a component or part of the baseband section 150 of the host portable communications device 100. A code division multiple access (CDMA) radio frequency (RF) section 125 provides a clock signal CLK 1 to the ratio counter 110 of the baseband section 150. Further, Global Positioning System (GPS) radio frequency section 130 provides a second clock signal CLK 2 to the ratio counter 110 of the baseband section 150. Circuitry of the portable communications device 100 uses an output of the ratio counter 110 to optimize circuit operations and allows for reduced power consumption.

In personal communication device 100, information indicative of the ratio between the frequencies of the two clock signals CLK 1 and CLK 2 is generated and output for use by device circuitry. One of either register 10 or register 11 is used to store a value causing an advancing slew while the other of register 10 or register 11 is used to store a value causing a retarding slew. These values are then alternatively used to generate a control signal S2, in response to the detection of the sampling edge crossing the target edge in the specified sense, rising or falling, for causing the count value of incrementing counters 5 and 7 to be captured and, if desired, read out. The clock signal CLK1 of the portable communications device 100 driving the CDMA RF section 125 is relatively stable and accurate, due, for example, to tracking an accurate pilot signal from a base station. The GPS clock signal CLK 2 driving the GPS RF section 130, on the other hand, is often generated by a crystal oscillator and is less stable, so that the accuracy of the frequency of CLK 2 at any given time is prone to vary. This is due to the fact that the frequency of a crystal oscillator tends to fluctuate as the temperature changes or to other factors. The values loaded into registers 10 and 11 are determined as described later based on the nominal frequencies of CLK1 and CLK2.

In an embodiment, the values loaded into register 10 and register 11 are chosen in accordance with calculations based upon the principles of convergents of continued fractions. More particularly, convergents of continued fractions are used to generate a series of rational approximations to an actual ratio. The denominators of two successive ratios are then used as the values input into the registers 10 and register 11, respectively.

The continued fraction expansion of real number x may be expressed as $$a_0+[1/(a_1+[1/(a_2+\ldots)])],$$

where the integers $a_1, a_2, a_3 \ldots$ are partial quotients. Rational numbers have a finite number of partial quotients, while the irrational numbers have an infinite continued fraction expansion. If the real number x has partial quotients $a_0, a_1, \ldots$, the rational number $p_n/q_n$ formed by considering the first n partial quotients $a_0, a_1, \ldots, a_n$ is typically called the nth convergent of x. The convergence of that number provides a rational approximation with a small denominator to a given real number. Successive convergents will have error values that are alternately positive and negative and which sequentially converge to the exact ratio, for example, the ratio of the ideal, or nominal, frequencies of clock signal CLK 1 and clock signal CLK 2. In view of this, continued fraction expansions are useful for selecting the values (divisors) that should be loaded into register 10 and register 11 of the invention 100.

Figure 5:
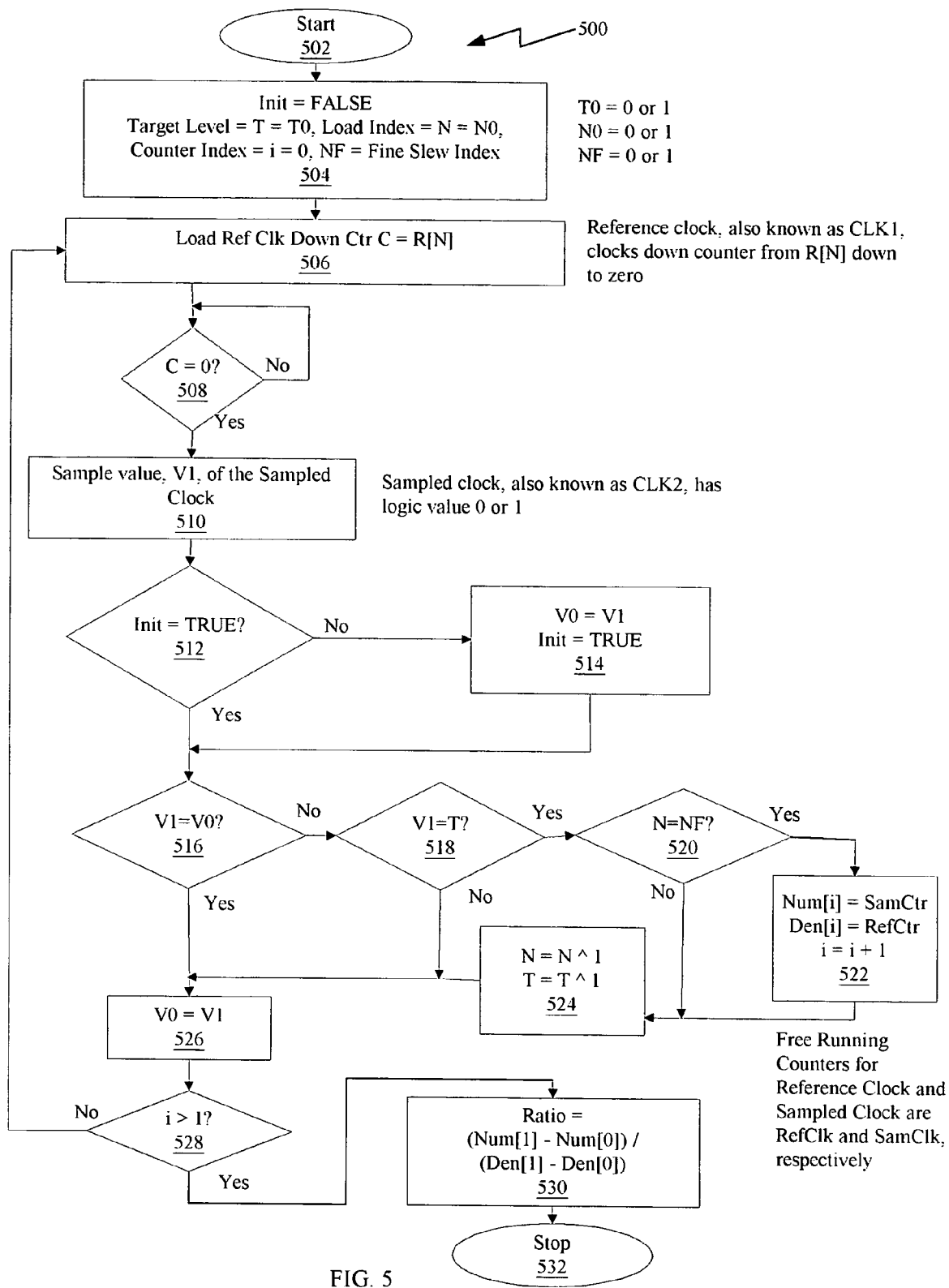
FIG. 5 is a flow diagram for frequency ratio counting, under an embodiment.

FIG. 5 is a flow diagram 500 for frequency ratio counting, under an embodiment. At startup 502, a number of state variables may be initialized. Since the reference clock has not yet taken a sample of the sampled clock, the prior value of the sampled clock, V0, is unknown. A variable init is set to FALSE to indicate this in 504. The target level, T, is initialized to either 0 or 1 504, A value T=0 means that the EARC target edge is falling and a target value T=1 means that the EARC target edge is riging. The load index N is set to 0 or 1. If N=0, the counter load value R0 will be used initially. If N=1, the counter load value R1 will be used initially 504. The load index that corresponds to a fine slew, NF, is set to 0 or 1, indicating that R0 or R1 is the fine slew value. The count index i is initialized to 0 504, indicating that no target edges have yet been detected. Each time a target edge is detected when the fine slew has been used as the counter load value, index i will be incremented and a pair of counter values corresponding to the free running counters clocked by the reference clock and the sampled clock will be latched. When at least two sets of counter values have been latched (i>1), a ratio value may be estimated.

Given these initial values, EARC operation may proceed as follows. The count down counter C is loaded with R(N) 506, where N=0 or 1 and R(0)=R0 and R(1)=R1. Counter C counts down by one for each cycle of the reference clock until C=0. When C=0 508, the sampling edge of the reference clock is used to sample the current value, V1, of the sampled clock 510.

If init=FALSE 512, then the prior value of the sampled clock, V0, is set equal to V1 and init=TRUE 514. If V1 is not equal to V0 516, an edge of the sampled clock has been detected. If V1=T 518, the target level was just sampled and the EARC has crossed a target edge of the sampled clock. If the last load index used, N, equals the fine slew load value index, NF 520, then the edge detected is a target edge detected with a fine slew. This means that the current sampling edge of the reference clock is very close (within one fine slew) of the desired target edge. Therefore, latch the reference clock and sampled clock free running counter and store them as Num(i) for the sampled clock counter and Den(i) for the reference clock counter and then the index I is increment 522.

For a target edge detected with either the fine or the coarse slew load value, toggle the load value index N. That is, if N=0, set N=1 and if N=1, set N=0 and the target level is toggled 524. The toggle of T is required because the new slew value will be in the opposite direction (retard versus advance, for example) so the sense of the target edge must also be reverse (rising versus falling). The current sampled clock value V1 is then saved as the new value of prior sampled clock value V0 526. If i<2, return to the step of loading C=R(N) 528, then repeat the above steps starting at step 506. Otherwise, if i>1, then compute the estimated EARC ratio as R=[Num(1)−Num(0)]/[Den(1)−Den(0)] 530.

Using two successive fine slew target edge detection counter value pairs as above provides a ratio estimate in the shortest possible time with a predictable uncertainty in the estimated ratio. If the index i is allowed to continue incrementing to a value k>1 so that the above ratio can be computed as R=[Num(k)−Num(0)]/[Den(k)−Den(0)], then the uncertainty of the estimated ratio is reduced by a factor proportional to 1/k.

Figure 6:
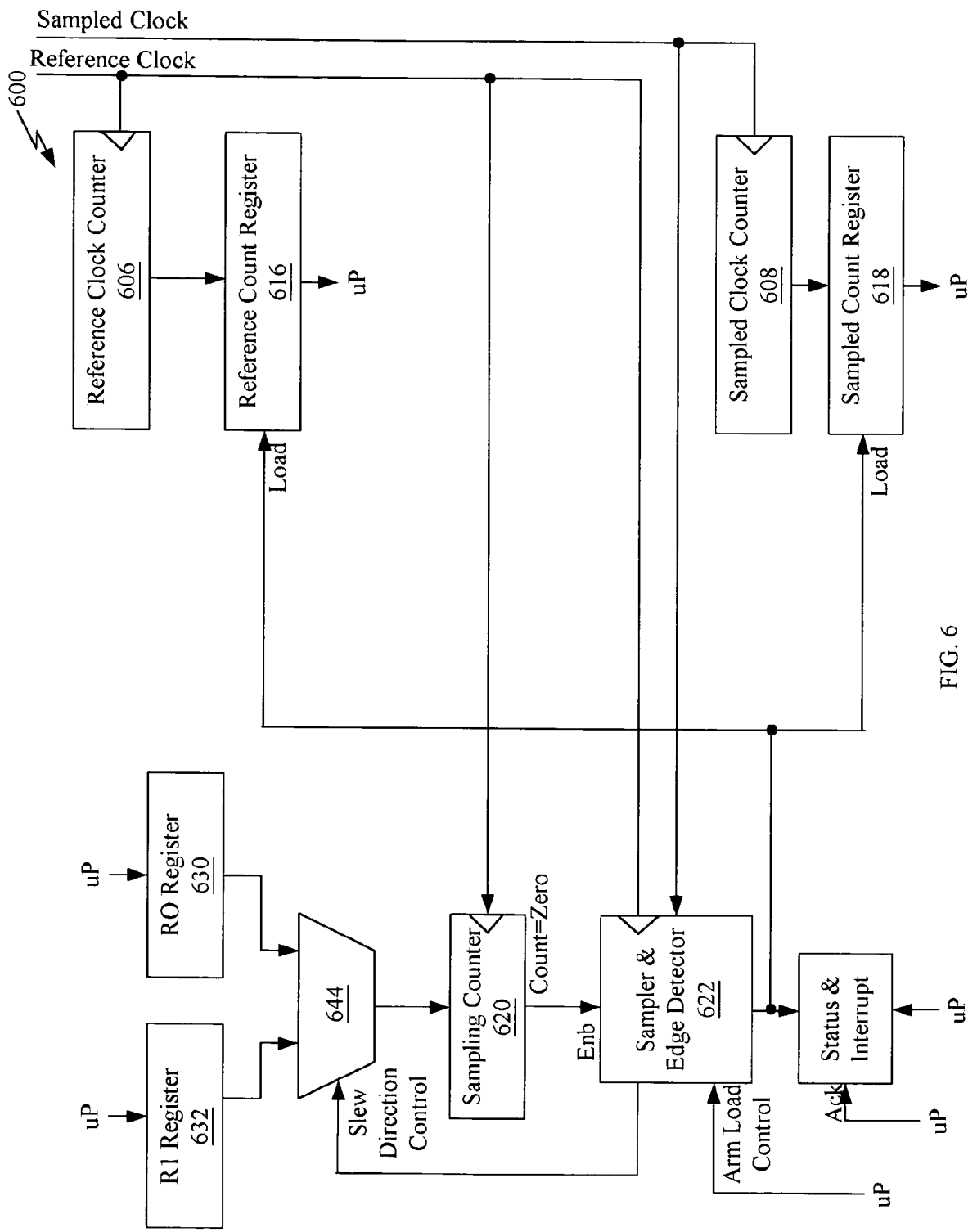
FIG. 6 is a block diagram of an Edge-Aligned Ratio Counter (EARC), under an embodiment.

FIG. 6 is a block diagram of an Edge-Aligned Ratio Counter (EARC) 600, under an embodiment. Generally, the purpose of a ratio counter is to measure the frequency of a first clock relative to a second clock. This can be done by counting the cycles $C_1$ of the first clock for a specific number of cycles $C_2$ of the second clock. Then the ratio of clock frequency $F_1$ to clock frequency $F_2$ is $R=R_1/F_2 \cong C_2/C_1$. The approximation in this formula stems from the fact that if the two clocks are not synchronous, there will always be an ambiguity of up to two cycles of the counted clock $C_1$ during the specified number of $C_2$ cycles. Because it is not known exactly how much of the last partial cycle of $C_1$ has elapsed, the inequality $C_2/(C_1+2) \leq R \leq C_2/C_1$ expresses the measurement uncertainty. In order to improve the accuracy of the measurement, the measurement interval can be increased. This provides an improvement at the expense of measurement time and power consumption in the circuit.

The EARC of an embodiment improves measurement accuracy with significantly reduced measurement time by arranging to make the measurements between points in time at which the edges of the two clocks are nearly aligned, with a predictable maximum alignment error. By doing so, the ratio of clock cycles is a ratio of integer values and the cycles of ambiguity are removed. As described below, the edges cannot be perfectly aligned by this method, but they can be typically aligned to sub-nanosecond accuracy, but the embodiment is not so limited. The exact alignment accuracy that can be achieved is a function of the approximate ratio of the clock frequencies and the characteristics of the clocks, such as jitter and ranges of variation in the frequencies.

Referring to the EARC 600, the two clock signals that are measured are the reference clock 602 and the sampled clock 604. The reference clock 602 drives a first free running continuous counter referred to as the Reference Clock Counter 606. The sampled clock 604 drives a second free running continuous counter referred to as the Sampled Clock Counter 608. The Reference Clock Counter 606 couples to an associated Reference Count Register 616, and the Sampled Clock Counter 608 couples to an associated Sampled Count Register 618. In order to make measurements, the Reference Count Register 616 and the Sampled Count Register 618 are loaded with the counter values at instants in time when the clock edges of the two clocks 602 and 604 are closely aligned.

Following loading of the Reference Count Register 616 and the Sampled Count Register 618, a microprocessor (not shown) reads the values in the Reference Count Register 616 and the Sampled Count Register 618. To calculate the frequency ratio, two sets of counter values are read, where each set of counter values is taken at a point of edge alignment. The differences in the two counter values read are then used to calculate the frequency ratio using the formula $$R=(C_2^{Ref}-C_1^{Ref})/(C_2^{Smp}-C_1^{Smp}),$$

where
$C_1^{Ref}$=Reference Clock Count value at alignment time 1
$C_2^{Ref}$=Reference Clock Count value at alignment time 2
$C_1^{Smp}$=Sample Clock Count value at alignment time 1
$C_2^{Smp}$=Sample Clock Count value at alignment time 2.

Since the counter values $C_2^{Ref}$, $C_1^{Ref}$, $C_2^{Smp}$, $C_1^{Smp}$ are captured at points when the two clock edges are closely aligned, the cycle count differences are integral values and the result is high accuracy.

In order to capture the counter values $C_2^{Ref}$, $C_1^{Ref}$, $C_2^{Smp}$, $C_1^{Smp}$ when the edges are aligned, a down counter is used to measure certain intervals using the reference clock 602, but the embodiment is not so limited. This down counter is referred to herein as the Sampling Counter 620. The Sampling Counter 620 is coupled to receive the contents of an $R_0$ Register 630 and an $R_1$ Register 632 via at least one multiplexer 644. The Sampling Counter 620 is clocked with signals from the Reference Clock 602.

In operation, the Sampling Counter 620 is loaded using one of two count values, $R_0$ or $R_1$, from the $R_0$ Register 630 or the $R_1$ Register 632, respectively. Each time the counter value of the Sampling Counter 620 reaches zero, the Sampling Counter 620 provides an enable signal Enb to the Sampler & Edge Detector 622, thereby enabling the reference clock 602 edge to sample the value of the sampled clock 604. The samples are used to detect edges of the sampled clock 604, as described below.

Figure 7:
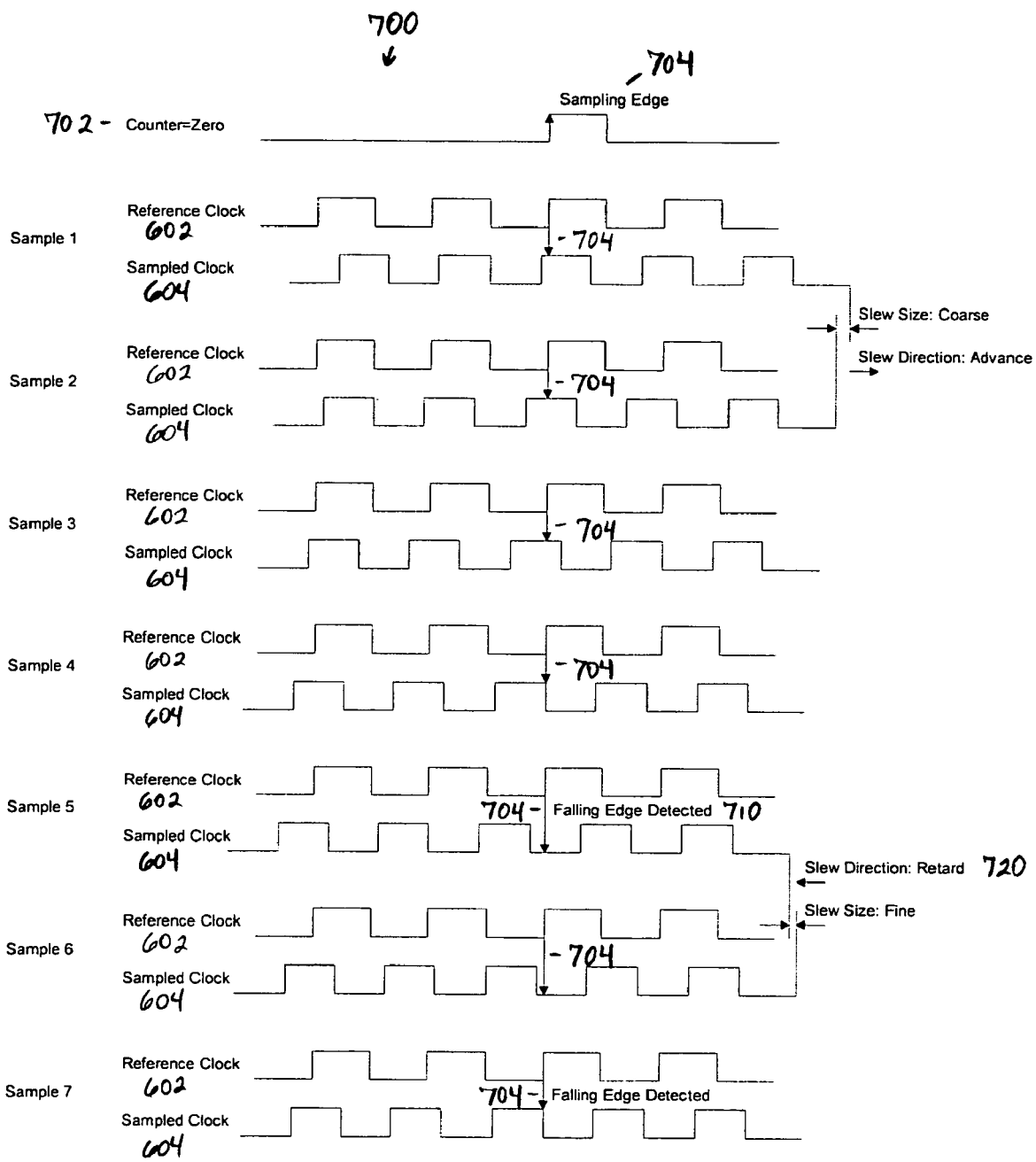
FIG. 7 shows sampling and edge detection, under the embodiment of FIG. 1.
Figure 11:
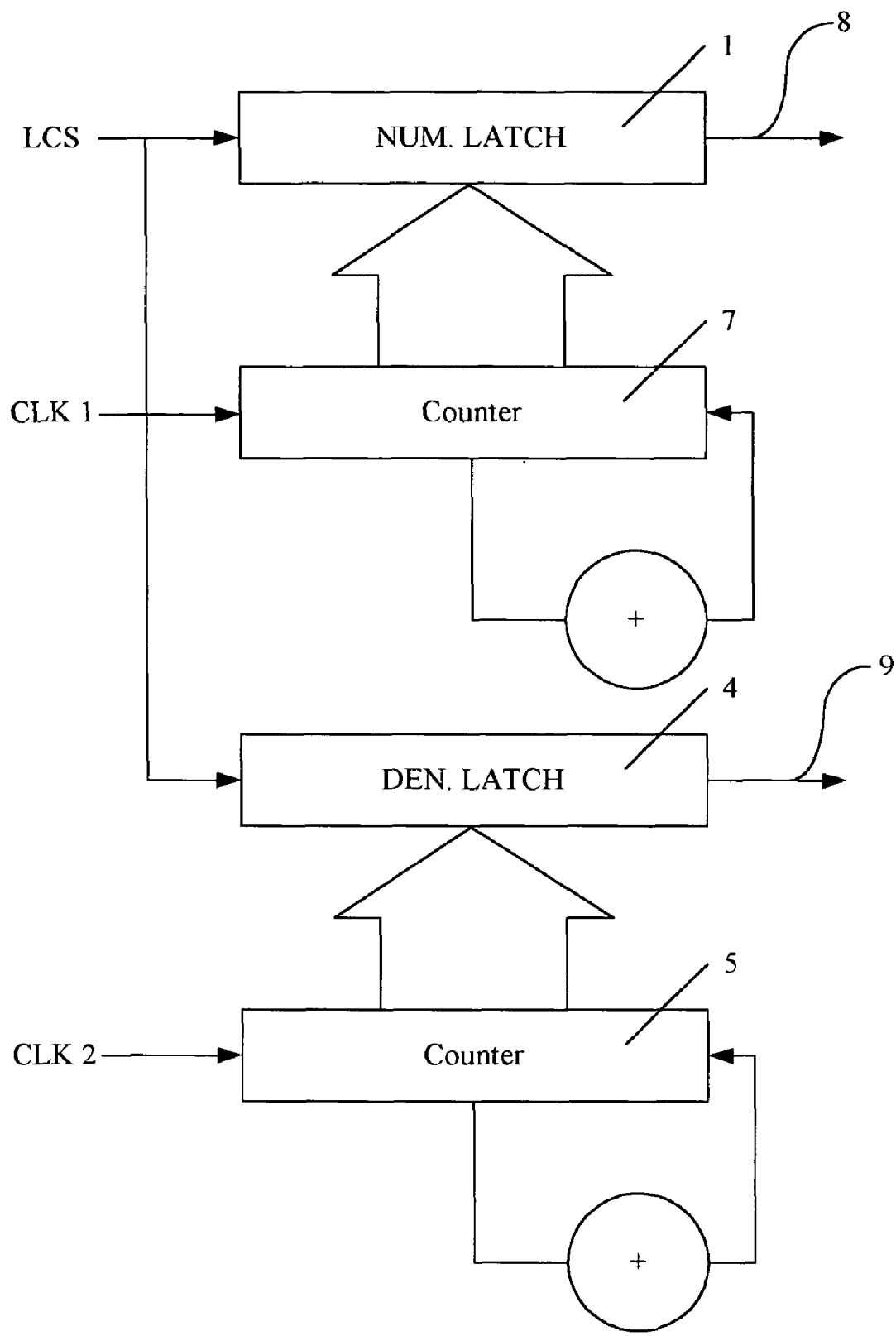
FIG. 11 is a typical system for determining a ratio between frequencies of different clocks under the prior art.

Turning to FIG. 7, a sampling and edge detection 700 using the EARC, under the embodiment of FIG. 1 is shown. The top line 702 shows the sampling event that occurs when the down counter hits the zero value. At the sampling edge 704, the sampled clock 604 value is captured by the reference clock 602 edge. The first instance of this sampling process is shown at Sample 1 event. The sampling edge 704 of the reference clock 602 is shown pointing to the sampled clock 604 value that is captured. At the Sample 1 event, the captured value is a one.

When the down count reaches zero, the Sampling Counter 620 is reloaded with a value from either the $R_0$ Register 630 or the $R_1$ Register 632 under control of the Sampler and Edge Detector 622. Since this is the first sample, no edge has been detected. Assume for this example that the first down count uses a value from the $R_0$ Register 630 referred to herein as the $R_0$ value. Since no edge was detected, the $R_0$ value will be loaded again. After a number of cycles of the reference clock 602 equal to $R_0$ cycles, the Sampling Counter value is again zero and the sampled clock 604 is again sampled 704 as shown at Sample 2 event. Note that the sample value is still a one, but that the sampling point of the reference clock 602 is slightly "advanced" relative to the sampled clock 604. Since both Sample 1 and Sample 2 have the same value, one, no edge has been detected and the $R_0$ value is again loaded into the Sampling Counter 620. At the Sample 3 and Sample 4 events, values of one are again sampled 704 and the $R_0$ value is again loaded into the Sampling Counter 620.

Continuing at the Sample 5 event, the sampled value is now a zero. If a falling edge is the target edge to be detected, and knowing that the sample phase is advancing, a transition from a one to a zero sample value implies that a falling edge 710 has been detected. When a falling edge 710 is detected, the value loaded to the Sampling Counter 620 is switched. Since the $R_0$ value had been the value in use, the value is switched to a value from the $R_1$ Register 632 referred to as the $R_1$ value when the target edge is detected.

The R1 value is chosen for loading into the Sampling Counter 620, as described herein, to cause the sampling phase of the reference clock 602 to slew in the opposite direction 720 relative to the sampled clock 604, a direction referred to herein as the "retard" direction 720. Thus, at the Sample 6 event, the sampling phase is earlier (i.e., it has retarded). Since no edge has been detected (this edge is the same value, zero, as the previous edge) the $R_1$ value is again loaded into the Sampling Counter 620. Then, at the Sample 7 event, the sampled value transitions to one. The zero to one transition of the sampled value, coupled with the fact that the "retard" slew value ($R_1$ value) is being used, indicates a "falling" edge has been detected. Consequently, the $R_0$ value is loaded into the Sampling Counter 620 for use as the count down value.

The example above shows that the sampling instant can slew back and forth across a desired edge of the sampled clock 604, assuming correct choices of the $R_0$ and $R_1$ values. The example therefore shows the concept of advancing and retarding the sampling instant as a function of the value loaded into the Sampling Counter 620. Also demonstrated is the concept that the slew increments of each of the $R_0$ and $R_1$ values may differ. In the example illustrated, the $R_0$ value is a coarse slew and the $R_1$ value is a fine slew, where the coarse slew moves the sampling point farther along the sampled clock period than the fine slew, but the embodiment is not so limited.

In the EARC 600 of an embodiment the Reference Clock Counter 606 and Sampled Clock Counter 608 are registered when the desired edge is detected. In practice, the edge detection that occurs while using the fine slew is used to latch these values, but the embodiment is not so limited. This choice is made because the fine slew results in a smaller error in edge alignment and a corresponding smaller error in the sampled clock measurement period.

To better explain the operation of the EARC of an embodiment, a specific numerical example is provided in the following description as an example of determining operational parameters.

The primary purpose of the EARC is to measure one clock frequency with respect to another. The typical EARC uses a reference clock having a higher frequency than the sampled clock but is not so limited. This naming convention does not prevent reversal of the operational roles of the two clocks however.

The example provided herein assumes that the basic clock for the associated digital signal processing (DSP) core is $56F_0=57.288$ MHz and that this clock will be related to an externally provided clock at a nominal frequency of 19.68 MHz. Hence, the DSP clock is the reference clock and the 19.68 MHz clock is the sampled clock.

The first step is to express the ratio of these two nominal clock frequencies as a sequence of continued fraction expansions. The result for the ratio, R, is $$R=1 \div (2+[1 \div (1+[1 \div (10+[1 \div (4+[\div (3+[1 \div (2+\frac{1}{2})])])])])])$$

In this example, the series ends after 7 terms, since these two clocks happen to be expressible as an exact rational fraction. As more and more terms are included in the expansion, the representation of the actual clock frequency ratio improves. The exact ratio, R, equals 820/2387, or 1/2.910975609756, which happens to end in a repeating fraction in which the digits "09756" repeat indefinitely. In FIG. 8, a table 800 that includes a sequence of rational fractions that express a ratio of two nominal clock frequencies, under an embodiment is shown. The table 800 shows the sequence of rational fractions that can be constructed as the number of terms from the continued fraction expansion is increased. The numerator and denominator of each fraction in the series are shown, along with the resulting ratio and the error in this ratio relative to the exact value, R.

To relate the numeric data above to the operation of the EARC, the reference clock is used to sample the sampled clock whenever the current down counter value reaches zero. The counter value may be loaded from either of the registers $R_0$ and $R_1$. After loading, the counter counts down to zero using the reference clock and then samples the sampled clock value using the sampling edge of the reference clock. Because the counter may require one reference clock cycle to reload, the effective count down time may be one greater than the loaded value. This implementation-dependent factor is accounted for in setting up the two counter values. When the sign of the sample clock is observed to change in the desired direction (the target edge can be rising or falling) between one sampled time and the next, the register used to load the down counter is switched between $R_0$ and $R_1$.

The values loaded into $R_0$ and $R_1$ are taken from the denominator values from two consecutive rows of table 800. To understand the reason for this choice, reference is made to a table that includes example EARC parameters and performance. FIG. 9 is a table 900 that includes example EARC parameters and performance, under an embodiment.

Assume selection of the numerator and denominator values in the row with five (5) terms from the continued fraction expansion in table 800. If the counter is loaded with the denominator value 424, assuming the implementation reduces it by one for the load cycle, then after every 425 cycles of the reference clock the sampled clock value will be sampled. Now, 425 cycles of the reference clock take 425/57288000=7.418657 μs, which equals the sampling period indicated in table 900. In addition, from the numerator column of the table 800, the sampled clock will experience approximately 146 cycles during this time. The amount of time for 146 cycles of the nominal sampled clock is 146/19680000=7.418699 μs, which is slightly longer than the sampling period by an amount 0.000043 μs=43 ps. The consequence of this "slip" value is that the desired edge of the sampled clock is catching up with the reference clock sample instant by 43 ps during each sample period. Alternatively, the sampling edge of the reference clock is slipping back toward the target edge of the sampled clock by this amount during every sampling period. Hence, this is referred to as a negative slip or a retarding slew. Considering that one period of the sampled clock is about 50813 ps, it can take up to 1182 sampling periods to find the desired edge. Since each count down period is 7.418657 μs, this can take up to 8.8 ms to accomplish. In most cases, this is a reasonable time for this portion of the process.

Once the sample edge of the count down sampler is closely aligned with the desired edge of the sampled clock, this alignment is maintained through succeeding sample events. To do this, the count down value is changed to the alternate load value ($R_0$ versus $R_1$). For example, if $R_0$ had contained the denominator value 424 from row 5 of table 800, the EARC would automatically switch to the value from $R_1$ when the desired edge is found. The value in $R_1$ would be chosen as the denominator value from row 4 or 6 of table 800. Typically, as will be seen, the two lowest values would be selected from the table that fit in the size of the registers implemented, where sixteen bit registers are used in an embodiment. Hence, row 6 is used because the scenario represented in row 7 turns out to be a degenerate case because the rational fraction realizes the true ratio exactly.

Realization of the exact true ratio leads to a slip value of zero and the possibility that the relationship between the reference and sampled edges would remain static. What is sought, for example, is for the sampled edge to drift in the opposite direction with the $R_1$ value as it drifted for the $R_0$ value. Hence, the best choice is to use the value from row 6 after the value from row 5. Again accounting for the cycle consumed for loading, the value 980 is used to realize a 981-cycle countdown. Note also that alternate lines of the table have alternate slip signs. This is an attribute of how the continued fraction works and is a necessary attribute for the values of $R_0$ and $R_1$ to have opposite slip signs when using denominator values from adjacent lines in the table.

Use of the values from row 6 of table 800 results in a count down period between sampling edges of 17.124 μs and a slip of +21 ps per period. That is, the sampling point has advanced in the sampled clock cycle, so the slew is an advance as opposed to a retard. Since slipping starts in this opposite direction from an offset of no more than 43 ps from the target edge, no more than 3 periods are needed to cross the desired edge again. At this edge detection, the sample and reference clock edges are no more than 21 ps off in alignment at the sampling instant. It is at this instant of the second ("finer") crossing that the two free-running counters that count reference clock and sampled clock cycles, respectively, are latched. As the desired edge of the sampled clock is slewed back and forth across the down counter sample instant, these values are latched whenever the finer of the two count down increments (in this case $R_1$ and 21 ps) has been used and a request has been made by the microprocessor for a measurement (Arm Load Control). Using two consecutive latched sets of values from these counters leads to difference values that represent very nearly integral numbers of cycles, due to the close edge alignment at the times the counters are latched. Based on the maximum alignment error, the accuracy of the measured relative frequency can be bounded. In the present example, the alignment error of 21 ps allows an accuracy of −0.36 ppm relative to the reference clock based on a single, consecutive pair of readings. A consecutive pair of readings means that the target edge is crossed while using the fine slew value with one crossing using the coarse fine in between. This accuracy is calculated as follows.

The maximum error magnitude in the alignment of the clock edges is 21 ps. A positive slip, or advancing slew, means that the measurement should have been a bit longer to match the count down time, by up to 21 ps, so the relative error is negative. A complete measurement cycle comprises one period of the coarser slip (7.418657 µs for 43 ps slip) plus enough of the finer slip periods to ensure (i.e., worst case) the desired edge crosses the sample point. This later amount is ceil (fabs (−43/21))*finer period=3*17.124005 µs. The total time is then 7.418657 +3*17.124005=58.790672 µs. Dividing the maximum error by the measurement period results in −21 ps/58.790672 µs=−0.36 e−6=−0.36 ppm. Note that this accuracy is for the case where the counter values are latched on two successive edge crossings using the fine slew rate. If better accuracy is desired, the second measurement can be taken after a longer time. For example, if in the current case a wait of approximately ten (10) full measurement cycles was undertaken before taking the second readings, then the measurement time would be 580.790672 µs and the accuracy would be −0.036 ppm. The microprocessor controls the time between measurements using the Arm Load Control mechanism.

Jitter on the clocks can limit the measurement performance of the EARC. Note that the slews cited in the numerical example above are on the order of a few tens of picoseconds. If the jitter on the clocks exceeds the slew value during the measurement period, the error in the edge alignment will exceed one slew increment. The general solution to this problem is to use coarser slew values and recapture the accuracy by extending the measurement period beyond the minimum measurement cycle, where a measurement cycle involves latching the counter values at two successive crossings of the target edge while using the fine slew value.

To continue the prior numerical example, suppose that the clock jitter is on the order of 100 ps, three-sigma. The approach would be to use the denominator values 32 and 131, so that the minimum slew value would be 106 ps. The penalty for using these values is that the fine slew provides a measurement accuracy of only 10.97 ppm. If the target accuracy is approximately 0.1097 ppm, for example, the measurement should be made over 100 complete measurement cycles, where a measurement cycle is one coarse slew period plus enough fine slew periods to get back to the target edge on the sampled clock. For the suggested parameters of this example, this would be 100*[CEIL (362/106)*2.286692+0.558581]= 970.5349 µs, which is a reasonable total measurement time. It is feasible to use measurement times of from ten (10) to 100 times larger to achieve accuracies of 10.97 or 1.097 ppb in total times of 10 to 100 ms, respectively. At such accuracies however the basic stability of the clocks will begin to be the limiting factor on useful measurement resolution.

The description above assumes that the clocks being measured are at least "close" to their nominal frequencies. Fundamentally, the assumption is that the clocks are close enough to their nominal frequencies that the coarse slew does not exceed one cycle of the sampled clock. If this were not the case, the target edge would be crossed without detection. Consider, for example, the case in the prior example using the values 32 and 131 as count down values. For a value of 32, the slew increment is 362 ps over a period of 0.558581 µs. The count down interval includes 32 cycles of the reference clock and is a time interval of 0.558581 µs (the period). The approximate number of sampled clock cycles is 11, for a time interval of 0.558943 µs. The sampled clock interval is too long by 362 ps, the slew increment. If the sampled clock is too fast or the reference clock is too slow, the sense of the slew can be reversed. For the sampled clock, this requires a frequency error of 0.000362/0.558943=+647.65 ppm. For the reference clock, the error would have to be −0.000362/0.558581=− 647.65 ppm, approximately the same value. For high quality crystals, an error of this magnitude is not expected. However, if one of the clocks is a 32 kHz RTC crystal, errors this large could occur.

For other parameters, the sensitivity can increase. For example, using the down count value pair 425/981, the critical clock error would be 0.000021/17.124005=1.226 ppm. Consequently, less accurate parameters would again be used to reduce the vulnerability to clock error and then increase the number of measurement cycles in order to improve the measurement accuracy.

As a final example, consider comparing $16F_0+1000$ kHz=16,369,000 Hz to 32768 Hz. FIG. 10 is a table 1000 that includes example EARC parameters and performance for an RTC crystal clock and frequency $16F_0$, under an embodiment. Use of the most accurate slews for a 16-bit register provides counter values of 11989 and 29473. The critical error threshold for clock frequency is approximately 0.000492/1800.54=0.273 ppm, which is clearly a problem.

Alternatively, consider the use of counter values 500 and 999. The critical error threshold using these counter values is 0.005160/61.03=84.55 ppm. It is likely that the RTC 32768 Hz crystal will exceed this error limit over an extended temperature range.

Consider first the range that can be correctly covered. To reverse the expected direction of the fine slew, the RTC should be 84.55 ppm high, or 32770.77 Hz. To reverse the expected coarse slew, the RTC should be 0.027965/30.55=915.4 ppm low. This frequency is 32738.005 Hz and is far less likely to be a problem.

It would also be possible to use the counter values 499 and 500 for a relatively coarse measurement. In this case, reversing the finer slew means the RTC frequency should be low by 0.027965/30.55=915.4 ppm. This frequency is 32738.005 Hz. To reverse the coarse frequency means the RTC should be high by 0.033125/30.48=1086.8 ppm at 32803.6 Hz. This range can be directly used to determine the ratio. Since the accuracy of a single measurement cycle is terrible, many cycles are required. A single cycle is 30.48+30.55*CEIL (0.033125/0.027965)=91.58 µs. This provides an accuracy of 305.4 ppm. Measuring over 1000 measurement cycles provides 0.3054 ppm accuracy in 91.58 ms.

Use of a typical ratio counter without edge alignment requires a much longer period of time in order to realize the same level of accuracy. A count is performed until $C_2/C_1$ is within 0.3054 ppm of $C_2/(C_1+2)$. Equivalently, the condition $2/C_1 < 0.3054$ e-6 ($C_1 > 6548788$) is required to be met. Since C1 is the RTC period, this measurement time is 199.85 seconds.

If a range greater than +/−900 ppm is required on the RTC, the EARC of an embodiment includes a temperature sensor for use in determining the approximate frequency range. The frequency range is then broken into pieces the EARC can cover unambiguously. A CDXO could be used in a similar way. Another alternative is to use the simple ratio counter just considered to measure the relative frequency range more coarsely. A resolution of 100 ppm uses approximately 610 ms. Unfortunately, each of the resulting intervals requires independent analysis to determine suitable EARC parameters and the resulting unambiguous ranges that can be covered.

Aspects of the EARC described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the EARC include: microcontrollers with memory (such as electronically erasable programmable read only memory (EEPROM)), embedded microprocessors, firmware, software, etc. Furthermore, aspects of the EARC may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the EARC is not intended to be exhaustive or to limit the system to the precise form disclosed. While specific embodiments of, and examples for, the EARC are described herein for illustrative purposes, various equivalent modifications are possible within the scope of the system, as those skilled in the relevant art will recognize. The teachings of the EARC provided herein can be applied to other processing systems and communication systems, not only for the systems described above.

The elements and acts of the various embodiments described above can be combined to provide further embodiments. These and other changes can be made to the EARC in light of the above detailed description.

In general, in the following claims, the terms used should not be contstrued to limit the EARC to the specific embodiments disclosed in the specification and the claims, but should be construed to include all processing systems that operate under the claims to provide ratio counting. Accordingly, the EARC is not limited by the disclosure, but instead the scope of the system is to be determined entirely by the claims.

What is claimed is:

1. A circuit comprising
at least one processor coupled to at least one counter circuit,
the at least one counter circuit receiving one of a first value and a second value in response to a first clock signal and generating a control signal under control of the received value,
the at least one counter circuit counting pulses of the first clock signal and a second clock signal and capturing the count of each of the first and the second clock signals in response to the control signal and determining a ratio between a frequency of the first clock signal and a frequency of the second clock signal using the captured count.

2. The circuit of claim 1, further comprising a first receiver having a first clock for generating the first clock signal.

3. The circuit of claim 2, wherein the first receiver is a telecommunications receiver.

4. The circuit of claim 2, further comprising a second receiver having a second clock for generating the second clock signal.

5. The circuit of claim 4, wherein the second receiver is a Global Positioning System (GPS) receiver.

6. The circuit of claim 1, further comprising at least one register for storing the first and second values.

7. The circuit of claim 1, wherein the at least one counter circuit comprises a first register for storing the first value and a second register for storing the second value.

8. The circuit of claim 7, further comprising a control signal generator that includes a first input for receiving input of the first value stored in the first register, a second input for receiving the second value stored in the second register, a third input for receiving the first clock signal, a fourth input for receiving the second clock signal and an output for outputting the control signal in accordance with the first and second values stored in the first and second register and the first and the second clock signals.

9. The circuit of claim 8, wherein the control signal generator further comprises:
at least one switch responsive to an edge transition signal, for selecting between the first input from the first register and the second input from the second register;
at least one decrementing counter for alternately receiving the value from the first or second register and decrementing the received value in synchronization with the first clock signal and generating an enable signal when the received value reaches zero;
at least one flip-flop responsive to the enable signal for generating the edge transition signal in accordance with the first clock signal and the second clock signal; and
at least one pulse generator responsive to the edge transition signal, for outputting the control signal to the count capture unit.

10. The circuit of claim 8, wherein the control signal generator generates the control signal when a transitional edge of the first clock signal is approximately coincidental with a transitional edge of the second clock signal.

11. The circuit of claim 10, further comprising a count capture unit responsive to the control signal output from the control signal generator for capturing values representative of the number of clock cycles of the first and the second clock signal, that occur within a given time period.

12. The circuit of claim 11, wherein the count capture unit further comprises:
  a first incrementing counter for counting the pulses of the first clock signal;
  a second incrementing counter for counting the pulses of the second clock signal;
  a first latch for storing the count value for the first incrementing counter in response to the control signal; and
  a second latch for storing the count value of the second incrementing counter in response to the control signal.

13. The circuit of claim 1, wherein the first value represents an approximation of time expressed as number of cycles of the first clock signal and the second value represents an approximation of the time expressed as number of cycles of the second clock signal.

14. The circuit of claim 13, wherein the first and the second values are selected in accordance with calculations based upon the principles of convergents of continued fractions.

15. The circuit of claim 13, wherein the first and the second values are selected with predetermined values associated with the number of cycles of the first clock signal and the number of cycles of the second clock signal and result in relatively coarse measurement.

16. The circuit of claim 1, wherein the first and the second clock signals are asynchronous.

17. A device comprising:
  at least one processor;
  at least one memory area coupled to the at least one processor and storing values representative of a first clock signal and a second clock signal; and
  at least one counter circuit coupled to the at least one processor and selectively receiving the stored values and generating a control signal under control of the stored values, the at least one counter circuit counting pulses of the first and the second clock signals, capturing the count of each of the first and the second clock signals in response to the control signal and determining a ratio between a frequency of the first and the second clock signals using the captured count.

18. The device of claim 17, further comprising a control signal generator that includes a first input for receiving a first stored value of a first register, a second input for receiving a second stored value of a second register, a third input for receiving the first clock signal, a fourth input for receiving the second clock signal, and an output for outputting the control signal in accordance with the first and the second values stored in the first and the second registers, respectively, and the first and the second clock signals.

19. The device of claim 18, wherein the first stored value represents an approximation of the frequency of the first clock signal and the second stored value represents an approximation of the frequency of the second clock signal, wherein the first and second stored values are selected in accordance with calculations based upon the principles of convergents of continued fractions.

20. The device of claim 18, wherein the control signal generator generates the control signal when a transitional edge of the first clock signal is approximately coincidental with a transitional edge of the second clock signal.

21. The device of claim 17, further comprising a count capture circuit responsive to the control signal for capturing values representative of the number of clock cycles of the first and the second clock signal that occur within a given time period.

22. A device comprising:
  means for receiving one of a first and second value in response to a first clock signal;
  means for generating a control signal under control of the received value;
  means for counting pulses of a first clock signal and a second clock signal and capturing the count of each of the first and second clock signals in response to the control signal;
  means for determining a ratio between a frequency of the first clock signal and a frequency of the second clock signal using the captured count; and
  means for generating the control signal when a transitional edge of the first clock signal is approximately coincidental with a transitional edge of the second clock signal.

23. The device of claim 22, further comprising: means for capturing values representative of the number of clock cycles of the first and the second clock signal that occur within a given time period in response to the control signal.

24. The device of claim 22, further comprising means for storing at least one of the first and second values in at least one register.

25. A method comprising:
  receiving one of a first and a second value in response to a first clock signal;
  generating a control signal under control of the received value;
  counting pulses of the first clock signal and a second clock signal and capturing the count of each clock of the first and the second dock signals in response to the control signal; and
  determining a ratio between a frequency of the first clock signal and a frequency of the second clock signal using differences of successive captured counts, respectively.

26. The method of claim 25, further comprising:
  generating the control signal when a transitional edge of the first clock signal is approximately coincidental with a transitional edge of the second clock signal.

27. The method of claim 25, further comprising:
  capturing values representative of the number of clock cycles of the first and the second clock signal that occur within a given time period in response to the control signal.

28. The method of claim 25, further comprising storing at least one of the first and second values in at least one register.

29. The method of claim 25, wherein the first value represents an approximation of time in terms of cycles of the first clock signal and the second value represents an approximation of time in terms of cycles of the second clock signal, wherein the first and second values are selected in accordance with calculations based upon the principles of convergents of continued fractions.

30. The method of claim 29 wherein:
  a frequency ratio is a ratio of the frequency of the first clock signal and an estimate of the frequency of the second clock signal, the frequency ratio being a sequence of continued fraction expansion where:
    frequency ratio=$a_0+[1/(a_1+[1/(a_2+ \ldots +1/a_n)])]$, where n=number of terms in the sequence of continued fraction expansion;

the method further comprising:

generating a sequence of rational fractions having a numerator and a denominator, each rational fraction being defined as the frequency ratio solved for each integer between 0 and n;

calculating an error for each rational fraction; and selecting a pair of consecutive denominators in the sequence of rational fractions corresponding to a lowest non-zero error as the first and second values.

31. The method of claim 29 wherein:

one of the first and the second values generates a coarse slew and the other of the first and the second values generates a fine slew;

the first clock signal generates a reference frequency and the second clock signal generates a sampled frequency and the sampled frequency is different from a nominal frequency value for the sampled frequency such that the coarse slew is greater than half of a period of an estimated slowest value of the sampled frequency;

a frequency ratio is a ratio of the frequency of the first clock signal and an estimate of the frequency of the second clock signal, the frequency ratio being a sequence of continued fraction expansion where:

frequency ratio=$a_0+[1/(a_1+[1/(a_2+ \ldots +1/a_n)])$, where n=number of terms in the sequence of continued fraction expansion;

the method further comprising:

generating a sequence of rational fractions having a numerator and a denominator, each rational fraction being defined as the frequency ratio solved for each integer between 0 and n;

calculating an error for each rational fraction; and selecting a pair of consecutive denominators in the sequence of rational fractions corresponding to a greater error than a lowest non-zero error as the first and the second values, such that the coarse slew is then shorter than a half period of the slowest expected sampled clock value.

* * * * *

UNITED STATES PATENT AND TRADEMARK OFFICE
CERTIFICATE OF CORRECTION

PATENT NO. : 7,792,650 B2 Page 1 of 1
APPLICATION NO. : 11/014684
DATED : September 7, 2010
INVENTOR(S) : Paul Underbrink et al.

It is certified that error appears in the above-identified patent and that said Letters Patent is hereby corrected as shown below:

Column 3, line 52, "111" should be --11--.

Column 9, after line 36 in the equation

"R=1÷(2+[1÷(1+[1÷(10+[1÷(4+[÷(3+[1÷(2+1/2)])])])])])" should be

--R=1÷(2+[1÷(1+[1÷(10+[1÷(4+[1÷(3+[1÷(2+1/2)])])])])])--

Column 16, line 36, "dock" should be --clock--.

Signed and Sealed this

Ninth Day of November, 2010

David J. Kappos
*Director of the United States Patent and Trademark Office*